United States Patent [19]
Parker et al.

[11] Patent Number: 5,986,572
[45] Date of Patent: *Nov. 16, 1999

[54] TELECOMMUNICATIONS SWITCHES

[75] Inventors: James Wilson Parker, Bishop's Stortford, United Kingdom; Ernst August Munter, Kanata, Canada

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/634,912

[22] Filed: Apr. 19, 1996

[30] Foreign Application Priority Data

Apr. 19, 1995 [GB] United Kingdom .................... 9507980

[51] Int. Cl.$^6$ ....................................... H04Q 3/00
[52] U.S. Cl. .................. 340/825.79; 340/825.8; 340/826; 340/827; 370/229; 370/351
[58] Field of Search ............................ 340/825.79, 825.8, 340/826, 827, 825.16, 825.03; 370/351, 387, 229, 398, 408, 422

[56] References Cited

U.S. PATENT DOCUMENTS

| | | |
|---|---|---|
| 4,630,258 | 12/1986 | McMillen et al. ................ 370/60 |
| 5,123,011 | 6/1992 | Hein ................................ 370/380 |
| 5,430,442 | 7/1995 | Kaiser et al. .................. 340/825.79 |

*Primary Examiner*—William A. Cuchlinski, Jr.
*Assistant Examiner*—Yonel Beaulieu
*Attorney, Agent, or Firm*—Lee, Mann, Smith McWilliams, Sweeney & Ohlson

[57] ABSTRACT

A telecommunications switch has a matrix architecture of n×m bus-interconnected, or space-switch interconnected, switch nodes together with additional switch nodes and n×m switch peripherals connected to the switch nodes externally of the bus (space-switch) interconnected switch node matrix. Fault protection redundancy is provided by providing each one of the peripherals with connections to two different switch nodes only one of which is enabled at any one time.

22 Claims, 10 Drawing Sheets ns switches constructed using a matrix (modular) architecture, and is particularly concerned with the provision of redundancy to provide a measure of protection against failure of the switch caused by failure of an individual component thereof.

Referring to FIG. 1, in one form of large capacity telecommunications switch, n smaller capacity switches, node switches, 10.1, 10.2 . . . 10.n, which are employed as buffers/time switches, on the periphery are connected to each other via an optical space switch core 11 which is functionally an n×n crosspoint. This core 11 may be implemented as a broadcast and select network arranged such that the incoming data streams from each of the n node switches 10 is first split n, ways, and then a selector mechanism (not shown) chooses which parts of the incoming data streams shall be onwardly directed to which node switch. The selector mechanism forms part of the core 11, and therefore, from the outside, the core appears as a crosspoint. The connections in the core 11 are re-arranged according to the traffic presented using a grant/request mechanism (not shown) under the control of core scheduler (not shown).

The arrangement of FIG. 1 can be re-drawn, as depicted in FIG. 2, to resemble a series of switches interconnected via a n-line bus 20. Each node switch 10.1, 10.2 . . . 10.n transmits on an associated line 20.1, 20.2 . . . 20.n of the bus, but can receive from any line. A selector 21.1, 21.2 . . . 21.n associated with each node switch determines which line is to be received by that node-switch at any given time. The switch of FIG. 2 is completely equivalent to that of FIG. 1, but suggests a different partitioning in which the selection of the required signal is performed at the node switch rather than in the core, which latter thus becomes a completely passive arrangement of optical waveguide splitters and connectors.

An n×m matrix arrangement of buffers and buses can be employed to make a large switch from an assembly of smaller units (nodes). The array may be square (n=m) or rectangular (n≠m). In such an architecture, as depicted in FIG. 3, n×n nodes 30 are arranged in a square matrix. Each node 30 has an external input port 31, an external output port 32, and internal input and output ports connected to vertical and horizontal buses 33 and 34. A signal applied to the external input 31 port of any particular node 30 can be routed by the switch to the external output port of any other node by propagation along the buses 33 and 34 and through, in most instances, a sequence of three nodes. Thus a signal applied to the external input port of node A and destined for the external output port of node D can follow the route ABD or the route ACD. More complicated routes e.g. AEFD are also possible if, for instance, required because of failure of some component.

An individual node 30 of the switch of FIG. 3 may take the form illustrated in FIG. 4. This depicts the external input and output ports 31 and 32, and the vertical and horizontal buses 33 and 34 which convey data over lines 37a and 34a, and control signals over lines 33b and 34b, with request and grant control signals R, G to and from a traffic control 40. A buffer 41 process inputs from a multiplexer 42 and provides outputs to a demultiplexer 43. The multiplexer 42 has three inputs comprising the external input 31, an input from the vertical data bus 33a via a bus line selector 44, and an input from the horizontal data bus 34a via bus line selector 45. The demultiplexer similarly has three outputs comprising the external output 32 and inputs 46 and 47 respectively to the vertical and horizontal data buses 33a and 34a.

Reverting attention to FIG. 3, the input and output ports 31 and 32 of each of the n×n nodes will be connected to a peripheral (not shown) associated with that node. It is normal practice to provide dual fabrics for fault protection, which would imply that the n×n associated peripherals would be connected not only to the switch fabric of FIG. 3 in one plane, but also to a duplicate of that switch fabric in an adjacent plane. The peripherals would normally also be duplicated or for instance each of a set of line cards connected to the switch would be connected to two different peripherals. Now in these circumstances, if the switch were a 16×16 matrix, then there will be 256 nodes in one plane, and a further 256 nodes in the other plane. In the normal course of events the first plane matrix will be active while the second plane matrix remains redundant (inactive) until a fault occurs in the first plane matrix, and at this stage the second plane matrix is activated. It is most likely that no more than one node or one bus will fail at any one time, and so for the sake of a single node failure that leaves 255 still in working order, all these 255 nodes are disabled by the activation of the second plane matrix and the consequent closing down of the first plane matrix.

SUMMARY OF THE INVENTION

The present invention is directed to obtaining efficient redundancy with reduced hardware duplication.

According to the present invention there is provided a telecommunications switch having a matrix architecture of bus-interconnected switch nodes and having switch peripherals connected to each of the switch nodes externally of the bus-interconnected matrix, wherein redundancy of operation is afforded by providing each one of said peripherals with enable/disable connections to two different switch nodes of the matrix.

The invention also provides a telecommunications switch having a matrix architecture of space-switch interconnected switch nodes and having switch peripherals connected to each of the switch nodes externally of the space-switch interconnected matrix, wherein redundancy of operation is afforded by providing each one of said peripherals with enable/disable connections to two different switch nodes of the matrix.

BRIEF DESCRIPTION OF THE DRAWINGS

There follows a description of telecommunications switches embodying the present invention in preferred forms. The description refers to the accompany drawings in which.

DETAILED DESCRIPTION OF PREFERRED EMBODIMENTS

Figure 1:
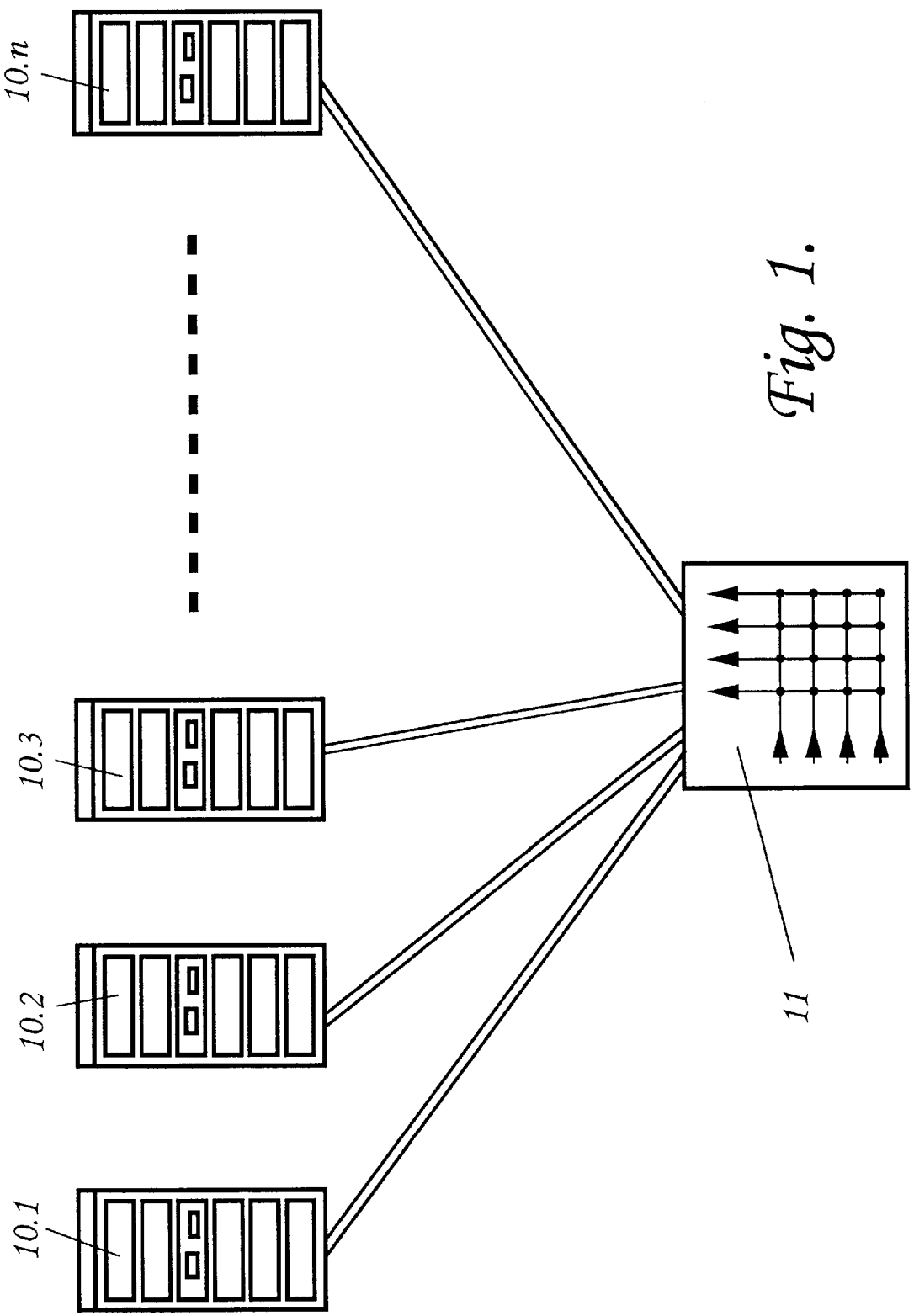
FIG. 1 depicts a large capacity telecommunications switch constructed from a set of smaller capacity switches interconnected by a space switch.
Figure 2:
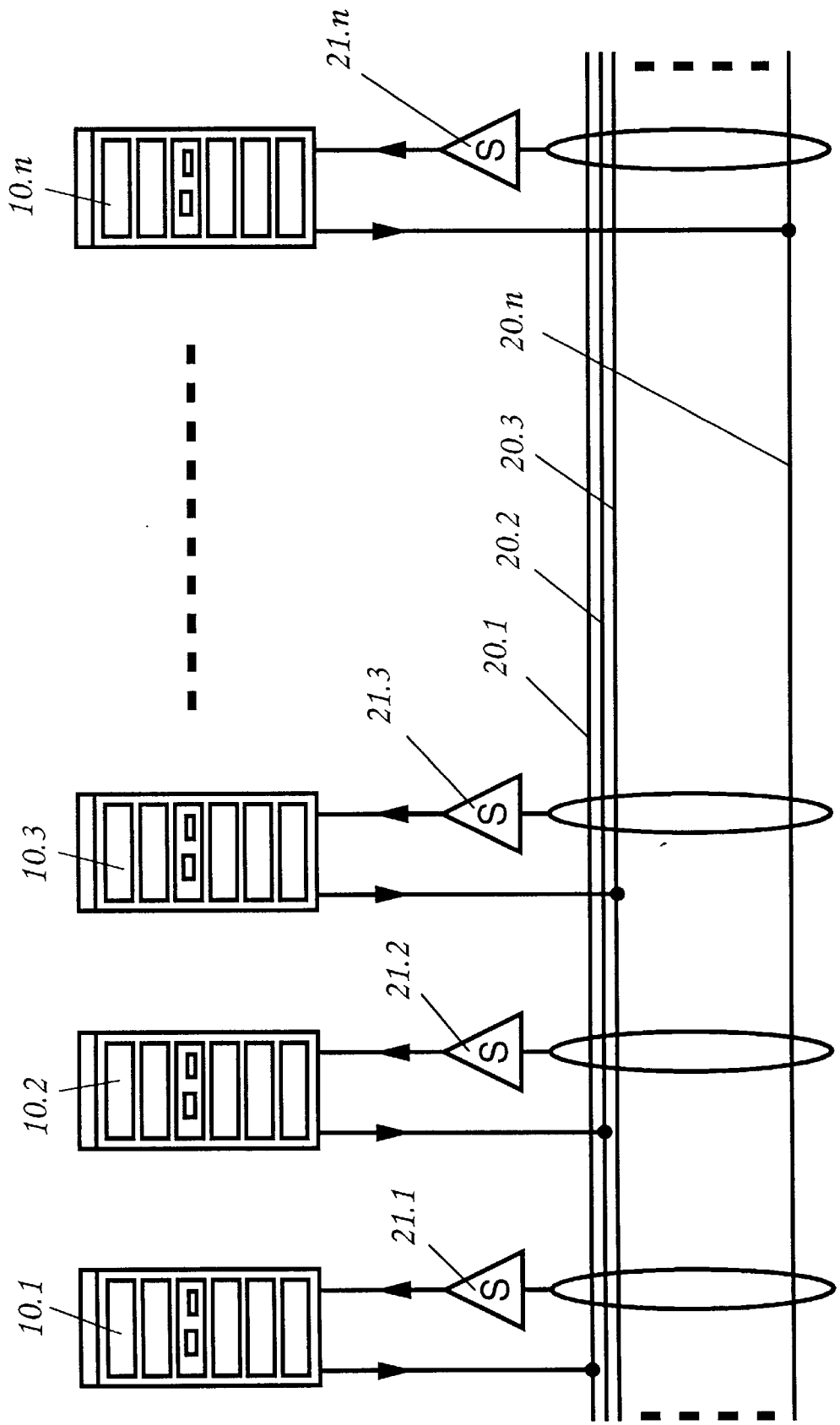
FIG. 2 depicts the telecommunications switch of FIG. 1 represented in a different way.
Figure 3:
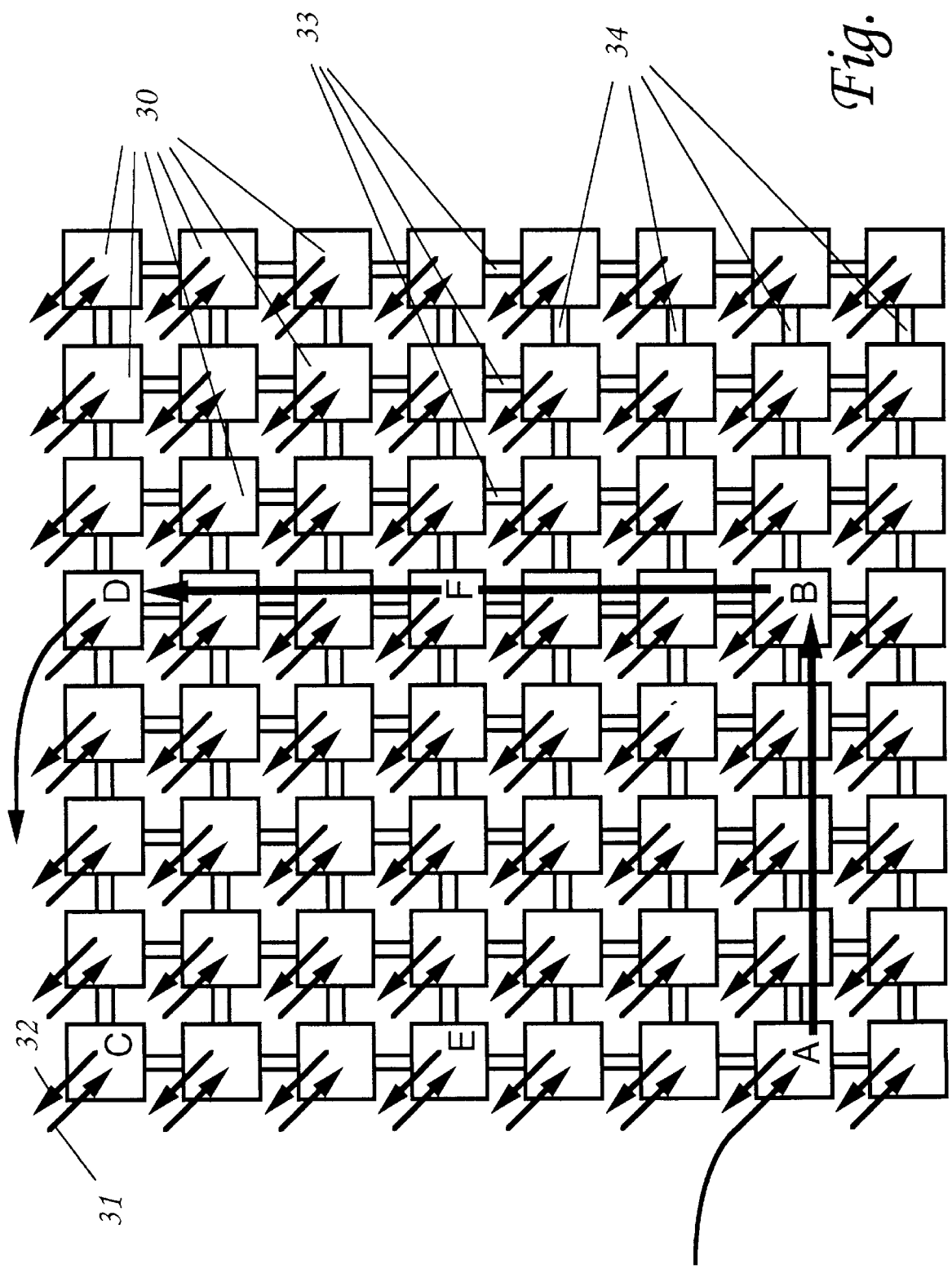
FIG. 3 depicts a large capacity telecommunications switch constructed from a set of smaller switches, switch nodes and associated peripherals, the switch nodes being connected together in a matrix array by vertical and horizontal buses.
Figure 4:
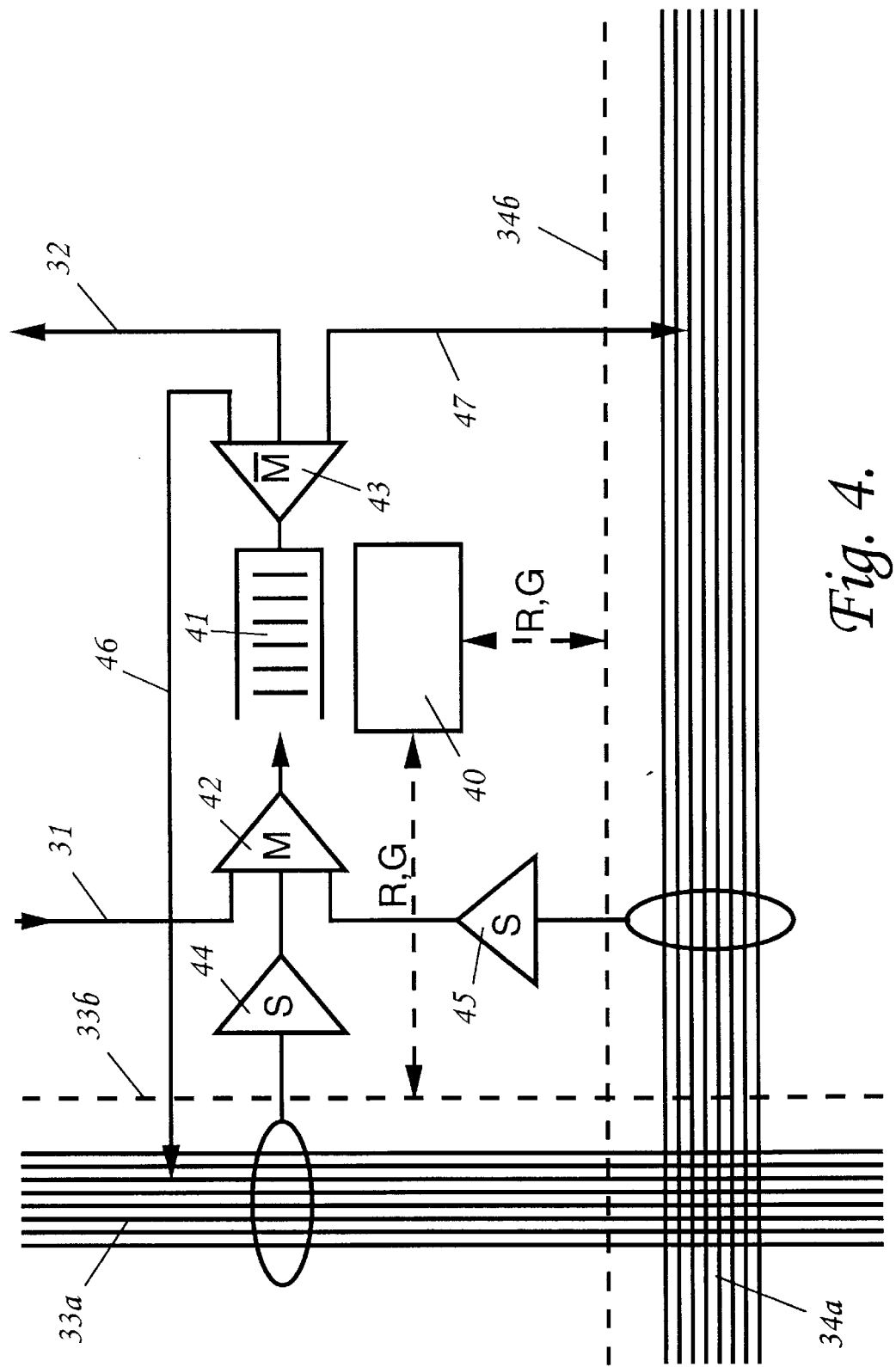
FIG. 4 depicts one of the switch nodes of FIG. 3 in greater detail.
Figure 5:
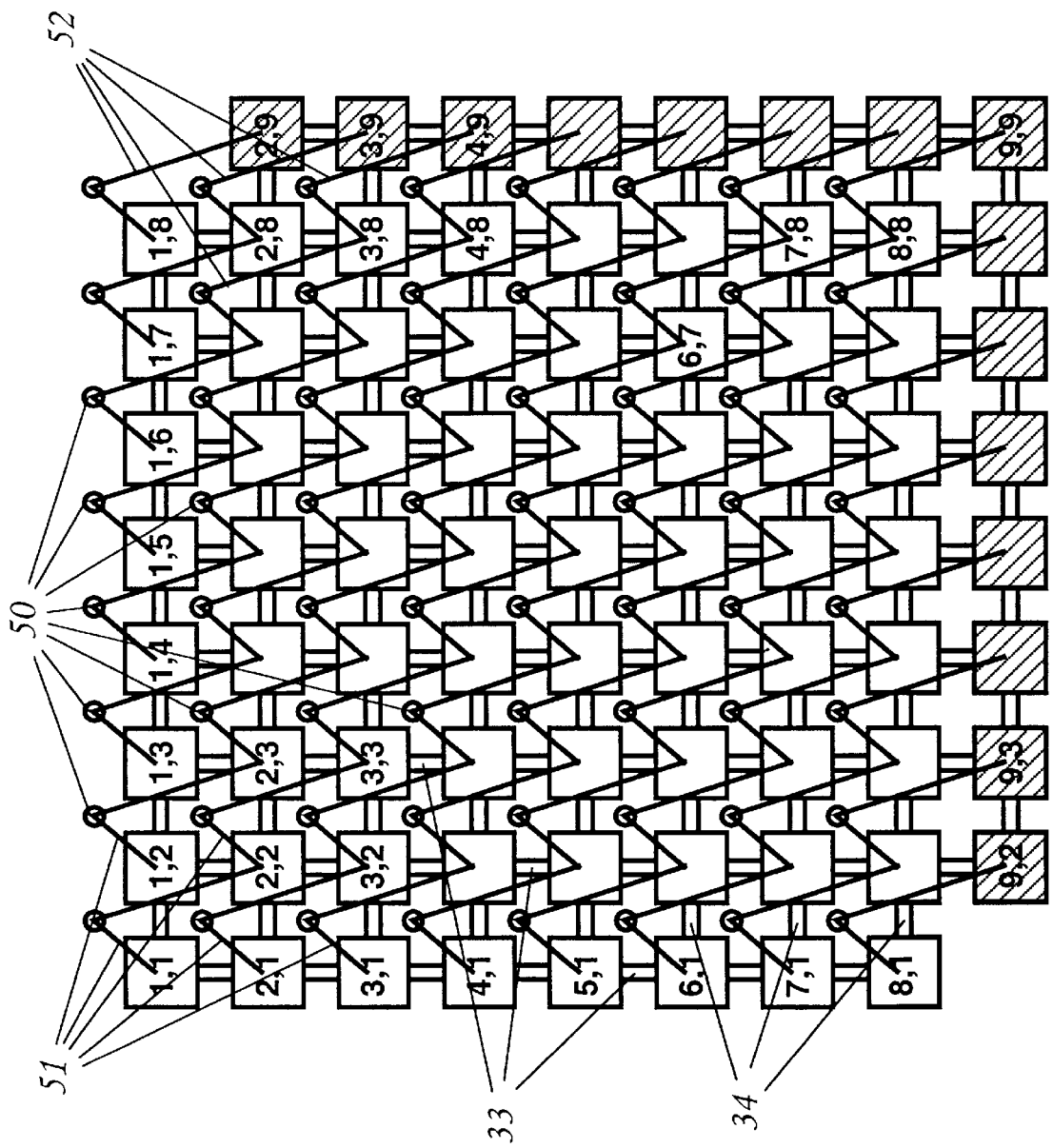
FIG. 5 depicts a large capacity telecommunications switch embodying the present invention in a preferred form, FIG. 6 Depicts the switch of FIG. 5, but shows only the connections between its switch nodes and peripherals that are enabled subsequent to the failure of a particular switch node.
Figure 6:
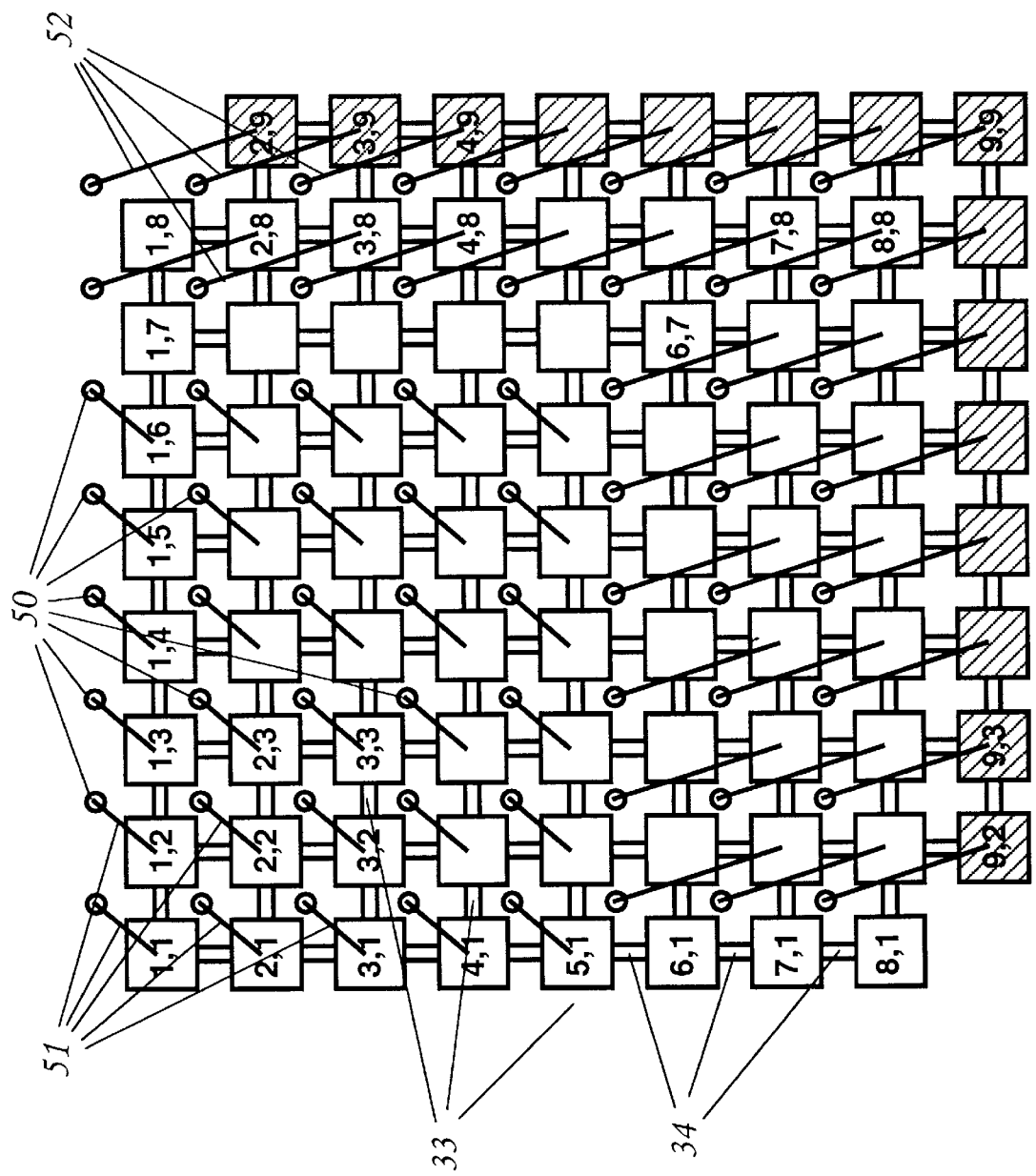

Referring now particularly to FIGS. 5 and 6, a telecommunications switch is illustrated having a matrix architecture bus-interconnected switch nodes 30 in an n×n array. (For convenience of illustration an 8×8 array is depicted.) Additional to the n×n array of nodes are 2n−1 further switch nodes 30, distinguished in FIGS. 5 and 6 by a diagonal hatching, and arranged in a row and a column to the right of and below the n×n main array. Each switch node 30 has a pair of internal ports respectively connected to the vertical and horizontal buses 33 and 34.

In the ensuing description each of these nodes will be labelled with a pair of numbers indicating the row and column position of that node in the array, numbering from the top right-hand corner. Thus switch node 30(1, 1) is the top right-hand corner switch node, whereas switch node 30(p, q) is the node that is at the intersection of row p with column q. Each switch node 30 has a pair of internal ports respectively connected to vertical and horizontal buses 33 and 34. Thus switch node 30(p,q) has its internal ports respectively connected to horizontal bus 34(p) and to vertical bus 33(q). Each switch node 30 also has a pair of external ports for connection to individual members of an n×n notional array of peripherals 50 which are labelled in the same way as the switch nodes 30. (The assembly of switch nodes 30 have been described as constituting an array because of the two dimensional bus connections between its members, but this is not to be understood as necessarily implying that they are actually arranged in a physical array of rows and columns. The assembly of peripherals 50 have been described as constituting a 'notional' array because the absence of direct interconnections between its members makes the due array-like characteristics of this assembly even more tenuous.) The first external ports of the additional switch nodes (shown with diagonal hatching) of row n+1 and column n+1 are left unconnected, while the first external ports of all the other switch nodes are connected by connections 51 to their corresponding peripherals having the same row and column numbers. Thus the first external port of switch node 30(p,q) is connected by a connection 51 to peripheral 50(p,q). The second external ports of the switch nodes of row 1 and column 1 are similarly left unconnected, while those of all the other switch nodes are connected by connections 52 to the peripherals with the next lower row and column numbers. Thus the second external port of switch node 30(p,q) is connected by a connection 52 to peripheral 50(p−1, q−1). Prior to any failure of the switch all the connections 51 are enabled, while all the connections 52 are disabled.

If there is a failure of switch node 30(p,q) then, for all peripherals 50(r,s) for which r<p and s<q, the connections 51 remain enabled, while for all peripherals 50(r,s) for which $r \leq p$ or $s \leq q$, then connections 51 are disabled, their place being taken by the enablement of corresponding connections 52. This is the condition depicted in FIG. 6 after the failure of switch node 30(6,7). (In this FIG. 6, in contradistinction to FIG. 5, only the enabled connections 51 and 52 are shown). If on the other hand it were a bus that failed then, in the case of failure of the vertical bus associated with the switch node 30(p,q), for all peripherals 50(r,s) for which s<q, the connections 51 remain enabled; while for all peripherals 50(r,s) for which $s \geq q$, the connections 51 are disabled, their place being taken by the enablement of corresponding connections 52. Correspondingly, in the case of failure of the horizontal bus associated with switch node 30(p,q), for all peripherals 50(r,s) for which r<p, the connections 51 remain enabled; while for all peripherals 50(r,s) for which $r \geq p$ the connections 51 are disabled, their place being taken by the enablement of corresponding connections 52.

Figure 7:
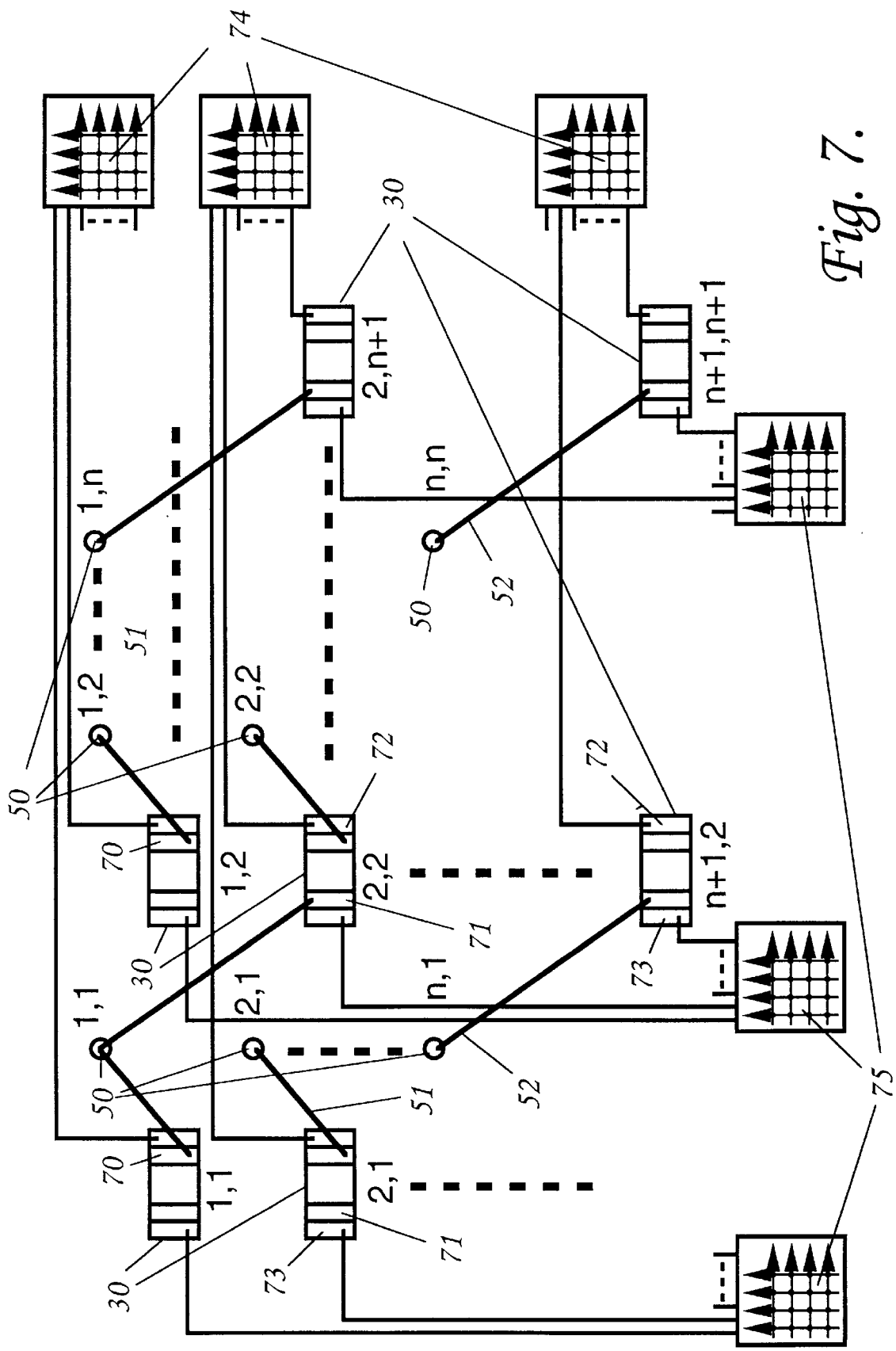
FIG. 7 depicts a switch having the same general redundancy provisions as the switch of FIG. 5, but with internal connections between the switch nodes by way of space switches instead of by way of buses.

The embodiment described above with particular refers to FIGS. 5 and 6 is an embodiment having horizontal and vertical buses but, having regard to the equivalence of function between buses and space switch cores described earlier with particular reference to FIGS. 1 to 4, it should be appreciated that a switch functionally equivalent to that of FIG. 5 is possible that employs space switch cores instead of buses. Such a switch is depicted in FIG. 7. In this switch there is an array of n×n switch nodes 30, plus the additional 2n−1 switch nodes, each of which is provided with a pair of external ports 70, 71 connected to an n×n array of peripherals 50 by connections 51 and 52 arranged in the same manner as in the switch of FIG. 5. Each switch node 30 additionally has a pair of internal ports 72 and 73. The internal port 72 of each switch node 30 is connected to a member of a set of n+1 space switch (n+1)×(n+1) cores 74 according to the row number of that switch node in the array. Similarly, its internal port 73 is connected to a member of a set of n+1 space switch (n+1)×(n+1) cores 75 according to the column number of the switch node in the array.

Although the foregoing specific description in relation to FIGS. 5, 6 and 7 has related to switches having a basic square matrix array of n×n switch nodes, plus an additional 2n−1 switch nodes for redundancy, it should be clearly understood that the invention is applicable also to basic rectangular matrix arrays of n×m switch nodes (n≠m), plus an additional n+m−1 switch nodes for redundancy.

Reverting attention specifically to the switch of FIG. 5, it may be observed that though $(n-1)^2$ of the switch nodes 30 each have connections to two different peripherals 50, the remaining 4n−2 switch nodes 30 each have only one connection to a peripheral 50. This suggests that the redundancy resulting from the provision of the 2n−1 switch nodes 30 additional to the basic n×n array can be improved upon to provide substantially equivalent redundancy protection with a reduced amount of additional hardware.

Redundancy which is provided with n additional nodes 30, instead of 2n−1, to the n×n array of switch nodes 30 of a switch will now be described with reference to FIG. 8. This arrangement uses much of the design philosophy of the switch of FIGS. 5 and 6, but though the additional switch nodes 30(n+1,2) to 30(n+1, n+1) are real, switch nodes 30(2,n+1) to 30(n, n+1) are phantoms that have no real existence, but are mappings of switch nodes 30(n+1,2) to 30(n+1,n). Thus the connection 52 shown to link peripheral 50(p,n) with phantom switch node 30(p+1, n+1) is, for all values of p in the range 1≦p≧n−1, actually a connection 51 linking peripheral 50(p,n) with real switch node 30(n+1, p+1). Similarly the horizontal bus connection to the phantom switch node 30(p+1, n+1) is actually the horizontal bus connection to real switch node 30(n+1, p+1). Finally, the horizontal and vertical bus connections to switch node 30(n+1, n+1) are respectively to the horizontal bus 34 of row 1 and to the vertical bus 33 of column 1.

Prior to the failure of any switch node 30, all the peripherals 50 are connected to their respective switch nodes 30 by the enablement of connections 51. The corresponding connections 52 are disabled, and connections 51 and 52 to the additional switch nodes of rows n+1 are all disabled. On the failure of any particular switch node 30(p,q) the connection 51 from its corresponding peripheral 50(p,q) is disabled, its place being taken by the enablement of its connection 52 to switch node 30(p+1, q+1). Similar changes are made to the connections 51 and 52 of each of the peripherals 50(p+1, q+1), 50(p+2, q+2), . . . and so on down the diagonal to the edge of the array. If p<q, this will be the right-hand edge of the array, in which case the final connection is a connection 52 to one of the phantom switch nodes of column n+1 which in reality is a real connection 51 to its mapped counterpart in row n+1. If p>q, the edge of the array will be the bottom edge, in which case the final connection is a connection 52 to one of the real switch nodes of row n+1. Finally, if p=q, the final connection is the connection 52 to the (real) switch node 30(p+1, q+1).

By way of example the case will now be considered in which n=8 and the failed switch node 30 is switch node 30(6,7). A connection, routed before failure, from peripheral 50(6,1) to peripheral 50(8,7) by way of switch nodes 30(6, 1), 30(6,7) and 30(8,7), can be routed (FIG. 9), after failure, via one of the additional switch nodes of row 9, for instance by way of switch nodes 30(6,1), 30(9,9), 30(1,7) and 30(8, 7), or 30(6,1), 30(9,6), 30(8,1) and 30(8,7).

The situation is slightly more complicated in the event of a bus failure. If for instance the vertical bus 33 of column q fails, then the connections 51 of all peripherals 50(r,s) where s≧q are disabled and their place is taken by the enablement of the corresponding connections 52. Similarly if the horizontal bus 34 of row p fails, then the connections 51 of all peripherals 50(r,s) where r≧p are disabled and their place is taken by the enablement of the corresponding connections 52. This restores full connectivity, but it can be seen that the additional switch node 30 of row n+1 that is connected to the failed bus is connected to only one functional bus instead of two, and therefore will have reduced bandwidth to the remainder of the switch node matrix. At least to some extent this can be overcome by making use of the inherent routing diversity in the network to redistribute the displaced traffic more effectively, and/or by connecting the unused external ports of the switch nodes 30 of row 1 and column 1 of the switch node matrix in a manner providing additional bus capacity.

Figure 10:
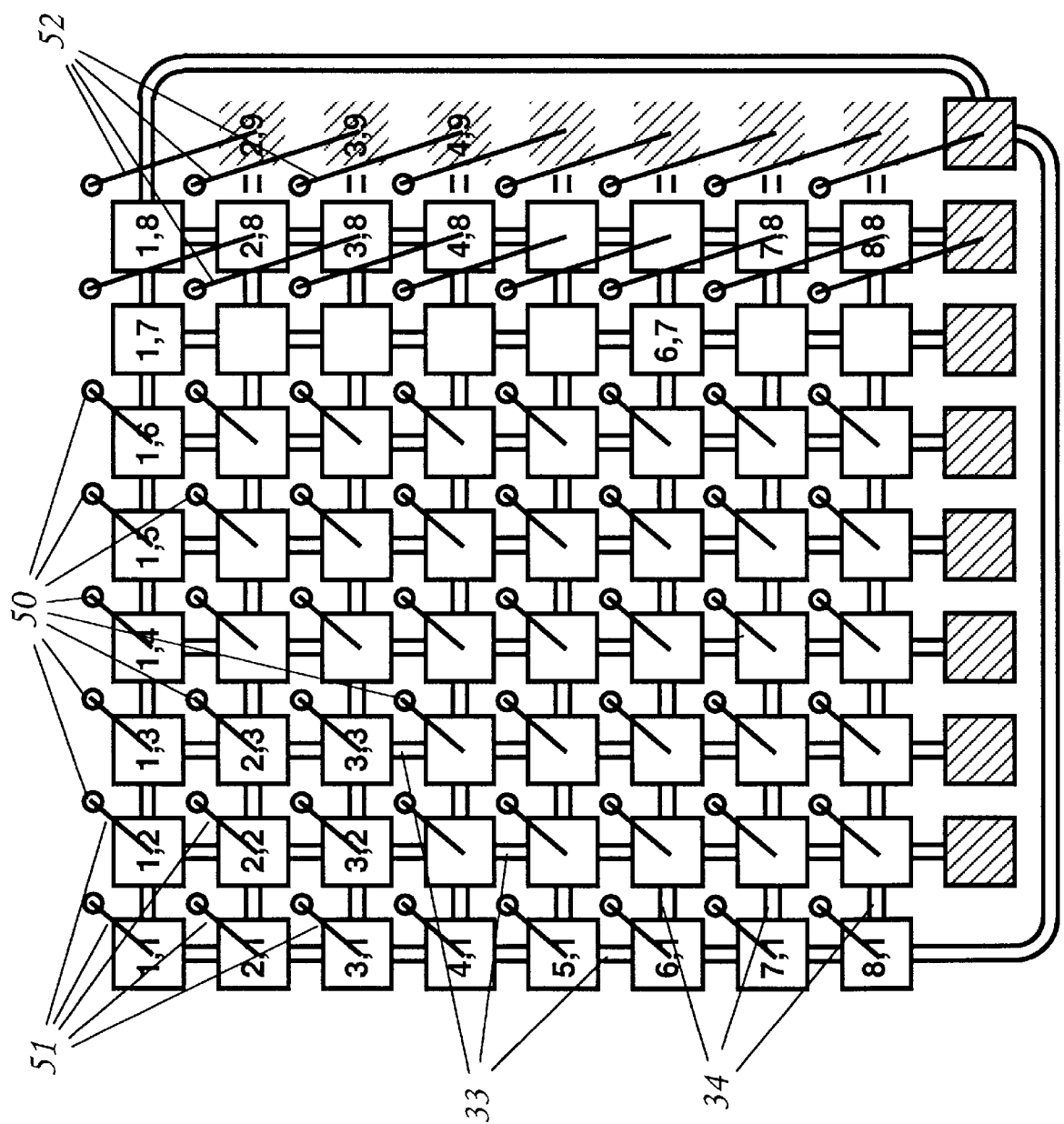
FIG. 10 depicts the switch of FIG. 8, but shows only the connections between its switch nodes and peripherals that are enabled subsequent to the failure of a particular vertical bus.

FIG. 10 illustrates the instance of the failure of the vertical bus 33 of column 6 in an array where n=8. All peripherals 50(p,q) are directly connected with a switch node. Peripheral 50(5,8) is connection notionally by way of phantom node 30(6,9) to additional switch node 30(9,6), which has a functional horizontal bus connection (horizontal bus 34 of row 6) but no functional vertical bus connection.

Figure 8:
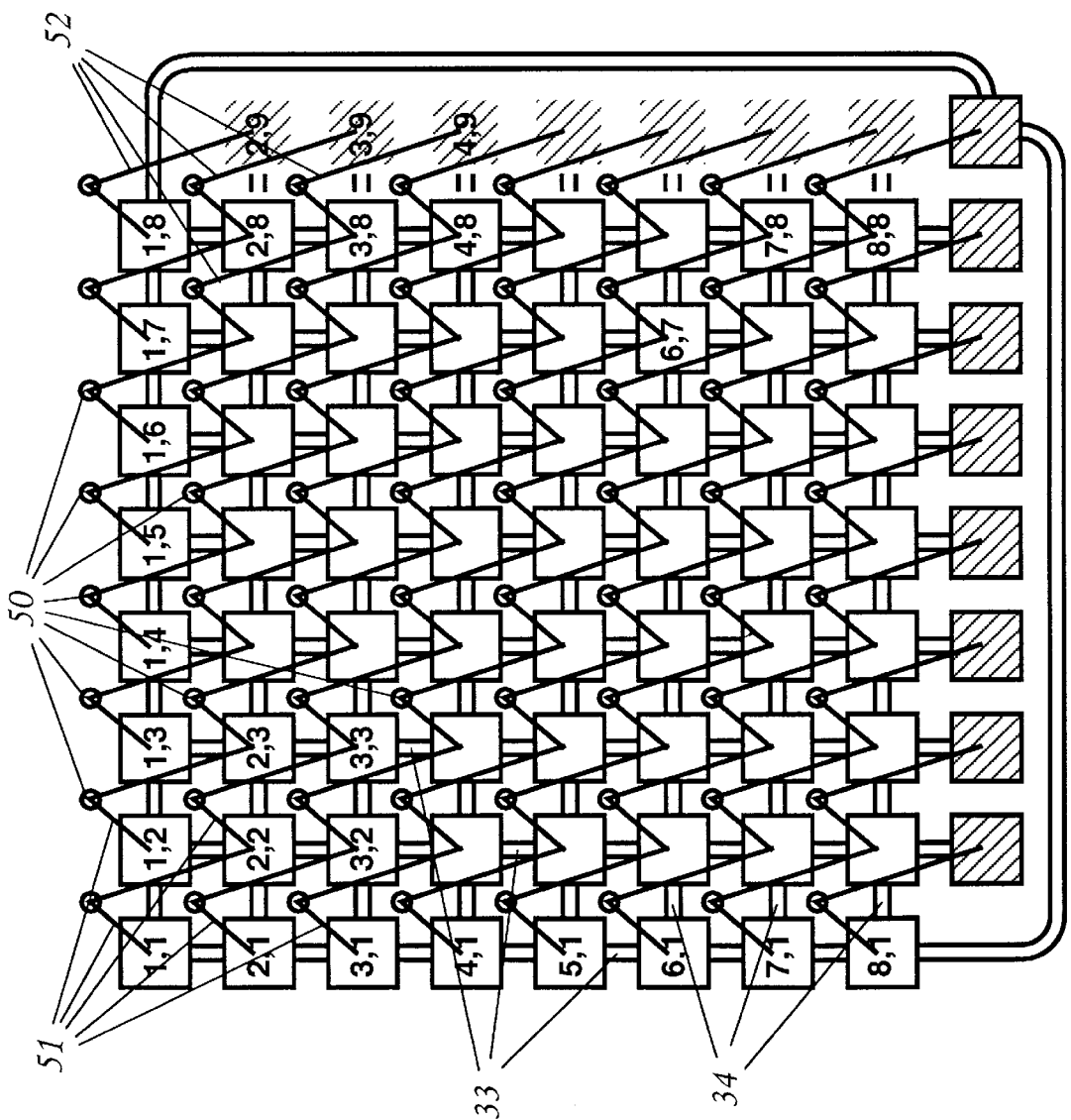
FIG. 8 depicts a large capacity telecommunications switch embodying the invention in a preferred form that requires less additional hardware provision than that of the switch of FIG. 5.
Figure 9:
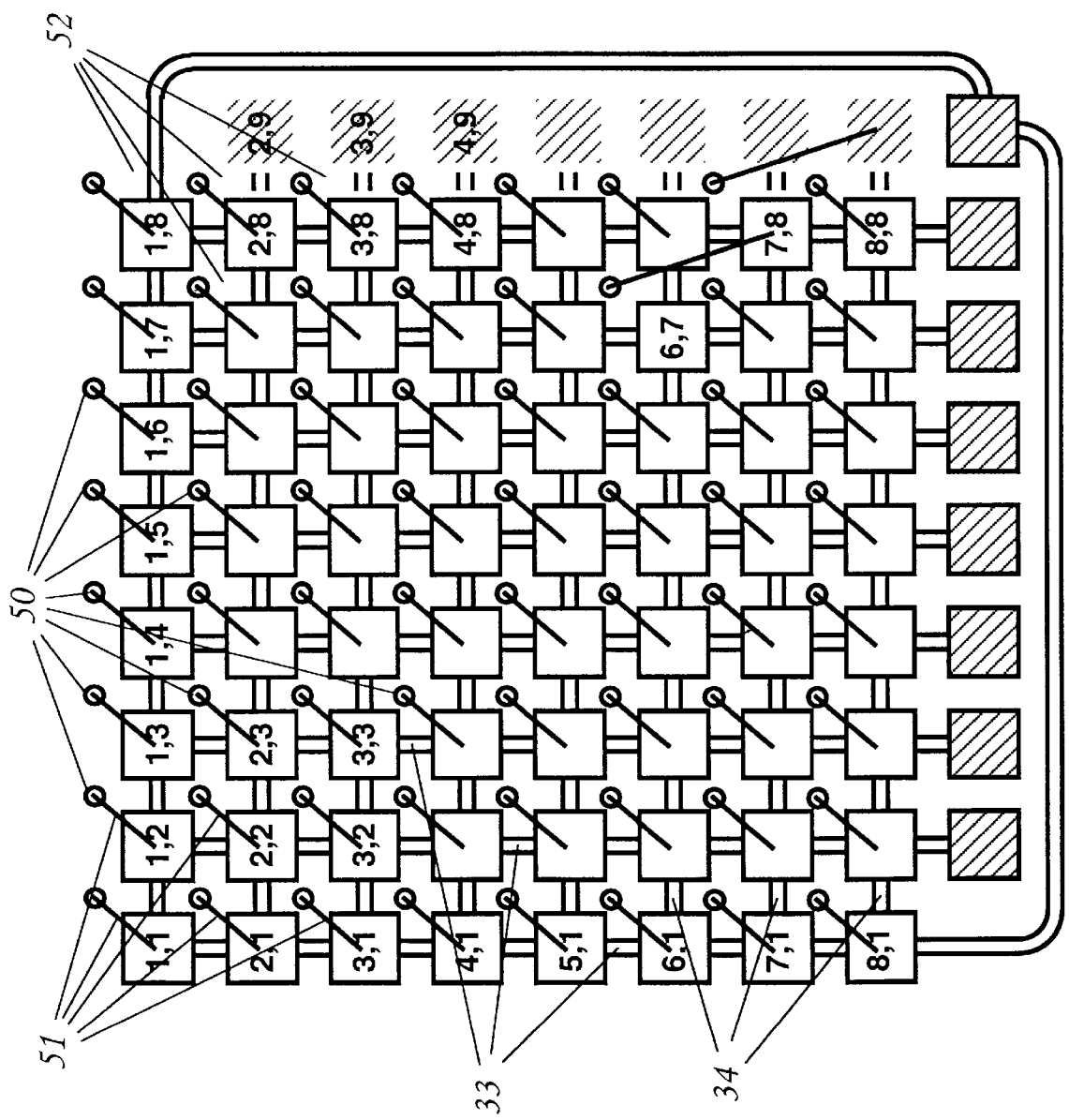
FIG. 9 depicts the switch of FIG. 8, but shows only the connections between its switch nodes and peripherals that are enabled subsequent to the failure of a particular switch node.

Although the particular matrix array of switch nodes of the switch of FIGS. 8, 9 and 10, excluding the additional switch nodes of row n+1, is a square n×n array, the basic arrangement is applicable, with minor modification, also to rectangular n×m arrays in which n≠m. Since the rows and columns are essentially interchangeable, attention may be confined without loss of generality to the situation in which n<m. In the square n×n array, the n phantom switch nodes 30(p, n+1), where 2≦p≦n, are mapped on to the n real switch nodes 30(n+1,q), where 2≦q≦n. In the n×m array, the n phantom switch nodes 30(p, m+1), where 2≦p≦n, are mapped on to a selection of n switch nodes out of the m switch nodes 30(n+1, q), where 2≦q≦m. Thus the rectangular array situation is distinguished from the square array one by the presence of a choice in the mapping. It will generally be preferred for this choice to be exercised in a way that avoids mapping any of the phantom nodes on to additional switch node 30(n+1, m) since this avoids the situation of having a peripheral 50 with connections 51 and 52 to switch nodes sharing a common vertical bus 33. An example of a mapping which avoids this is the one in which phantom switch node 30(p, m+1), where 2≦p≦n, maps on to real switch node 30(n+1, p).

The switch node matrices of the switches of FIGS. 5 to 10 have all been provided with additional switch nodes 30 for the purposes of redundancy for fault protection. It has been shown that this use of additional switch nodes leaves some switch nodes in the matrix with unused ports. In the case of the (p,q), (p+1, q+1) switch node/peripheral interconnection schemes particularly exemplified, these switch nodes with unused ports are to be found in the top row and the left-hand column of the switch node matrix, but with alternative interconnection schemes they can be located elsewhere in the matrix. The presence of the unused ports indicates that some or all of the additional switch nodes 30 can be dispensed with, while retaining the requisite redundancy for instance by additional bus connections utilising the previously unused ports.

In this way it can be arranged that full connectivity is not lost by failure of a single switch node 30 or bus 33, 34, though there will normally be some reduction in available switching capacity in the event of such failure. In order to minimise this reduction it may be desirable to modify the (p,q), (p+1, q+1) switch node/peripheral interconnection scheme so that displaced traffic resulting from the failure of any one switch node or bus is more evenly spread through the matrix. With appropriate traffic engineering the loss of switching capacity can be kept small enough to be tolerable in a practical environment.

We claim:

1. A telecommunications switch having a matrix architecture of bus-interconnected switch nodes and having switch peripherals connected to each of the switch nodes externally of the bus interconnected matrix architecture, wherein redundancy of operation is afforded by providing each one of said peripherals with enable/disable connections externally of the bus-interconnected matrix architecture to two different switch nodes of the matrix architecture.

2. A telecommunications switch as claimed in claim 1, wherein said two different switch nodes are connected to different pairs of interconnection buses.

3. A telecommunications switch as claimed in claim 1, where there are n×m peripherals constituting a notional n×m array, and wherein the switch nodes comprise an n×m array together with an additional n+m−1 switch nodes.

4. A telecommunications switch as claimed in claim 3 wherein, for all integral values of p and q where 1≦p≦n and 1≦q≦m, the two external connections of the peripheral occupying row p and column q of the notional array of peripherals comprise a connection to the switch node occupying row p and column q in the array of switch nodes, and a connection to the switch node occupying row p+1 and column q+1 in the array of switch nodes.

5. A telecommunications switch as claimed in claim 1, wherein there are n×m peripherals constituting a notional n×m array, and wherein the switch nodes comprise an n×m array together with an additional m switch nodes.

6. A telecommunications switch as claimed in claim 5, wherein, for all integral values of p and q where $1 \leq p \leq n$ and $1 \leq q \leq m-1$, the two external connections of the peripheral occupying row p and column q of the notional array of peripherals comprise a connection to the switch node occupying row p and column q in the array of switch nodes, and a connection to the switch node occupying row p+1 and column q+1 in the array of switch nodes, and wherein for all integral values of $1 \leq p \leq n$ the two external connections of the peripheral occupying row p and column m of the notional array of peripherals comprise a connection to the switch node occupying row p and column m in the array of switch nodes, and a connection to a different one of the set of switch nodes occupying row n+1 in the array of switch nodes.

7. A telecommunications switch as claimed in claim 6, wherein for all integral values of $1 \leq p \leq n$, the two external connections of the peripheral occupying row p and column m of the notional array of peripherals, do not include an external connection to the switch node occupying row n+1 and column m in the array of switch nodes.

8. A telecommunications switch as claimed in claim 3, wherein n=m.

9. A telecommunications switch as claimed in claim 8, wherein, for all integral values of p and q where $1 \leq p \leq n$ and $1 \leq q \leq n$, the two external connections of the peripheral occupying row p and column q of the notional array of peripherals comprise a connection to the switch node occupying row p and column q in the array of switch nodes, and a connection to the switch node occupying row p+1 and column q+1 in the array of switch nodes.

10. A telecommunications switch as claimed in claim 5, wherein n=m.

11. A telecommunications switch as claimed in claim 6, wherein n=m.

12. A telecommunications switch having a matrix architecture of space-switch interconnected switch nodes and having switch peripherals connected to each of the switch nodes externally of the space-switch interconnected matrix architecture, wherein redundancy of operation is afforded by providing each one of said peripherals with enable/disable connections externally of the space-switch interconnected matrix architecture to two different switch nodes of the matrix architecture.

13. A telecommunications switch as claimed in claim 12, wherein said two different switch nodes are connected to different pairs of interconnection space-switches.

14. A telecommunications switch as claimed in claim 12, where there are n×m peripherals constituting a notional n×m array, and wherein the switch nodes comprise an n×m array together with an additional n+m−1 switch nodes.

15. A telecommunications switch as claimed in claim 14 wherein, for all integral values of p and q where $1 \leq p \leq n$ and $1 \leq q \leq m$, the two external connections of the peripheral occupying row p and column q of the notional array of peripherals comprise a connection to the switch node occupying row p and column q in the array of switch nodes, and a connection to the switch node occupying row p+1 and column q+1 in the array of switch nodes.

16. A telecommunications switch as claimed in claim 12, wherein there are n×m peripherals constituting a notional n×m array, and wherein the switch nodes comprise an n×m array together with an additional m switch nodes.

17. A telecommunications switch as claimed in claim 16, wherein, for all integral values of p and q where $1 \leq p \leq n$ and $1 \leq q \leq m-1$, the two external connections of the peripheral occupying row p and column q of the notional array of peripherals comprise a connection to the switch node occupying row p and column q in the array of switch nodes, and a connection to the switch node occupying row p+1 and column q+1 in the array of switch nodes, and wherein for all integral values of $1 \leq p \leq n$ the two external connections of the peripheral occupying row p and column m of the notional array of peripherals comprise a connection to the switch node occupying row p and column m in the array of switch nodes, and a connection to a different one of the set of switch nodes occupying row n+1 in the array of switch nodes.

18. A telecommunications switch as claimed in claim 17, wherein for all integral values of $1 \leq p \leq n$, the two external connections of the peripheral occupying row p and column m of the notional array of peripherals, do not include an external connection to the switch node occupying row n+1 and column m in the array of switch nodes.

19. A telecommunications switch as claimed in claim 14, wherein n=m.

20. A telecommunications switch as claimed in claim 19 wherein, for all integral values of p and q where $1 \leq p \leq n$ and $1 \leq q \leq n$, the two external connections of the peripheral occupying row p and column q of the notional array of peripherals comprise a connection to the switch node occupying row p and column q in the array of switch nodes, and a connection to the switch node occupying row p+1 and column q+1 in the array of switch nodes.

21. A telecommunications switch as claimed in claim 16, wherein n=m.

22. A telecommunications switch as claimed in claim 17, wherein n=m.

* * * * *